(12) United States Patent
Xu

(10) Patent No.: US 12,463,674 B2
(45) Date of Patent: Nov. 4, 2025

(54) AUDIO TRANSMISSION METHOD AND ELECTRONIC DEVICE

(71) Applicant: VIVO MOBILE COMMUNICATION CO., LTD., Dongguan (CN)

(72) Inventor: Haikun Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 437 days.

(21) Appl. No.: 17/945,057

(22) Filed: Sep. 14, 2022

(65) Prior Publication Data

US 2023/0016243 A1    Jan. 19, 2023

Related U.S. Application Data

(63) Continuation of application No. PCT/CN2021/079656, filed on Mar. 9, 2021.

(30) Foreign Application Priority Data

Mar. 16, 2020   (CN) .......................... 202010180161.9

(51) Int. Cl.
*H04B 1/16*    (2006.01)
*H04B 1/00*    (2006.01)

(52) U.S. Cl.
CPC ......... *H04B 1/1646* (2013.01); *H04B 1/0067* (2013.01)

(58) Field of Classification Search
CPC .... H04B 1/005; H04B 1/0053; H04B 1/0067; H04B 1/1646; H04B 1/1661; H04B 1/1669; H04B 1/1676; H04B 1/1684; H04S 1/00; H04S 1/005
See application file for complete search history.

(56) References Cited

U.S. PATENT DOCUMENTS

| | | | |
|---|---|---|---|
| 8,509,692 B2 * | 8/2013 | Ryle ....................... | H04H 20/61 455/553.1 |
| 10,271,152 B1 | 4/2019 | Tong et al. | |
| 10,715,898 B2 * | 7/2020 | Li ........................ | H04R 1/1058 |

(Continued)

FOREIGN PATENT DOCUMENTS

| CN | 2325945 Y | 6/1999 |
|---|---|---|
| CN | 1526256 A | 9/2004 |

(Continued)

OTHER PUBLICATIONS

Second Office Action issued in related Chinese Application No. 202010180161.9, mailed Apr. 27, 2023, 7 pages.

(Continued)

*Primary Examiner* — Quochien B Vuong
(74) *Attorney, Agent, or Firm* — IPX PLLC

(57) ABSTRACT

An audio transmission method and an electronic device are provided. The audio transmission method includes: modulating, when the first electronic device transmits audio to a second electronic device, an audio signal transmitted to the second electronic device into at least two target radio frequency signals; and combining the at least two target radio frequency signals in a first time slot, and outputting a combined radio frequency signal to the second electronic device, where frequency bands of the at least two target radio frequency signals are different in the first time slot.

6 Claims, 2 Drawing Sheets

(56) References Cited

U.S. PATENT DOCUMENTS

| | | | | |
|---|---|---|---|---|
| 11,063,664 B2 * | 7/2021 | Wheeler | ............ | H04B 10/1143 |
| 2009/0228284 A1 * | 9/2009 | Moon | ................... | G10L 19/035 |
| | | | | 704/500 |

FOREIGN PATENT DOCUMENTS

| | | | | |
|---|---|---|---|---|
| CN | 104320188 A | | 1/2015 | |
| CN | 104540084 A | | 4/2015 | |
| CN | 105791961 A | | 7/2016 | |
| CN | 106301455 A | | 1/2017 | |
| CN | 108429949 A | | 8/2018 | |
| CN | 109445740 A | | 3/2019 | |
| CN | 110290412 A | | 9/2019 | |
| JP | 04079537 A | * | 3/1992 | ............... H04L 9/00 |
| JP | H0479537 A | | 3/1992 | |
| WO | 2013150334 A1 | | 10/2013 | |

OTHER PUBLICATIONS

Third Office Action issued in related Chinese Application No. 202010180161.9, mailed Jul. 18, 2023, 7 pages.

Stephen Wood, "Essentials of UWB", Xi'an Jiaotong University Press, chapter 3, Jul. 1, 2012, 5 pages.

Qingwei Du, "Mobile Computing in Wireless Communications", Beijing University of Aeronautics and Astronautics Press , Aug. 31, 2016, 4 pages.

Ping Zhang, "Educational Information Technology Application Course", Shaanxi Normal University Press, chapter 3, Sep. 1, 2016, 3 pages.

Extended European Search Report issued in related European Application No. 21771311.4, mailed Jun. 19, 2023, 11 pages.

First Office Action issued in related Chinese Application No. 202010180161.9, mailed Nov. 22, 2022, 4 pages.

International Search Report issued in corresponding International Application No. PCT/CN2021/079656, mailed May 28, 2021, 4 pages.

* cited by examiner

AUDIO TRANSMISSION METHOD AND ELECTRONIC DEVICE

CROSS-REFERENCE TO RELATED APPLICATIONS

This application is a continuation of International Application No. PCT/CN2021/079656, filed on Mar. 9, 2021, which claims priority to Chinese Patent Application No. 202010180161.9, filed on Mar. 16, 2020. The entire contents of each of the above-identified applications are expressly incorporated herein by reference.

TECHNICAL FIELD

The present disclosure relates to the field of communication technologies, and in particular, to an audio transmission method and an electronic device.

BACKGROUND

With the rapid development of wireless communication technology and the gradual expansion of the market, the radio transmission technology of the audio (for example, the Bluetooth transmission technology) is applied more and more widely in wireless communications. Currently, when an electronic device transmits audio to a plurality of wireless devices, audio streams are usually transmitted to different wireless devices at different times. In this way, utilization of the wireless transmission frequency band is low, resulting in a low wireless transmission rate of audio data.

SUMMARY

Embodiments of the present disclosure provide an audio transmission method and an electronic device.

According to a first aspect, an embodiment of the present disclosure provides an audio transmission method, applied to a first electronic device, and the audio transmission method includes:
  modulating, when the first electronic device transmits audio to a second electronic device, an audio signal transmitted to the second electronic device into at least two target radio frequency signals; and
  combining the at least two target radio frequency signals in a first time slot, and outputting a combined radio frequency signal to the second electronic device, where frequency bands of the at least two target radio frequency signals are different in the first time slot.

According to a second aspect, an embodiment of the present disclosure further provides an electronic device, where the electronic device is a first electronic device and includes:
  a modulation module, configured to modulate, when the first electronic device transmits audio to a second electronic device, an audio signal transmitted to the second electronic device into at least two target radio frequency signals; and
  an outputting module, configured to: combine the at least two target radio frequency signals in a first time slot, and output a combined radio frequency signal to the second electronic device, where frequency bands of the at least two target radio frequency signals are different in the first time slot.

According to a third aspect, an embodiment of the present disclosure further provides an electronic device, including a processor, a memory, and a computer program stored in the memory and executable on the processor, and when the computer program is executed by the processor, steps of the audio transmission method according to the first aspect are implemented.

According to a fourth aspect, an embodiment of the present disclosure further provides a computer-readable storage medium, where the computer-readable storage medium stores a computer program, and when the computer program is executed by a processor, steps of the audio transmission method according to the first aspect are implemented.

BRIEF DESCRIPTION OF DRAWINGS

The following describes the accompanying drawings for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
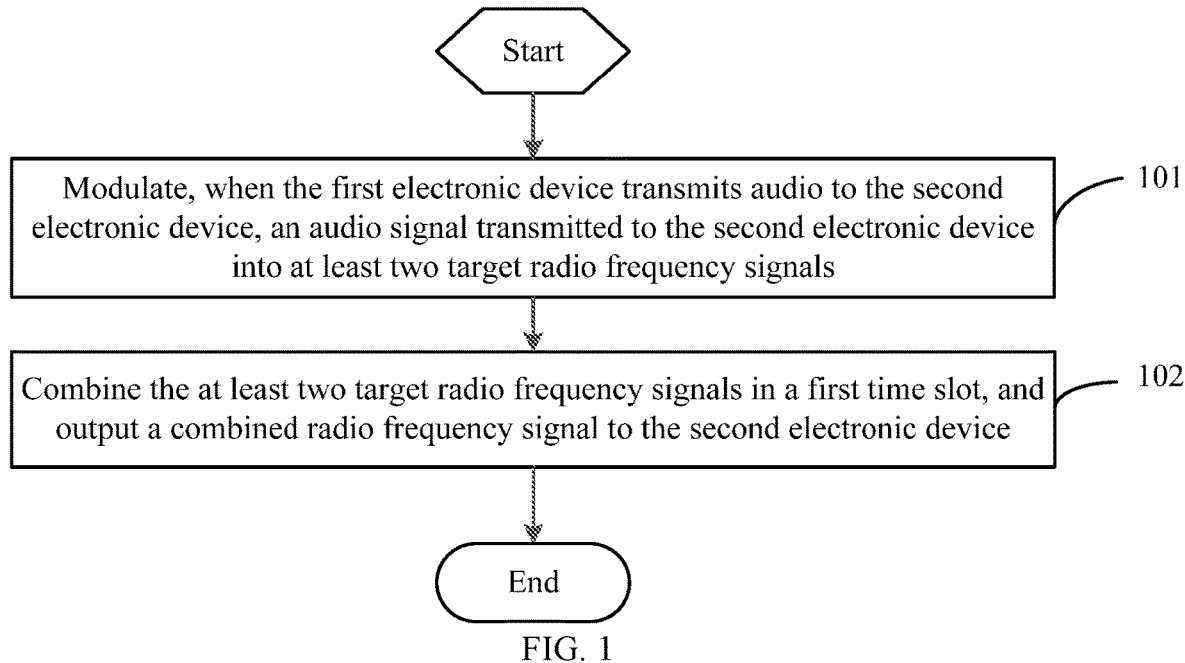
FIG. 1 is a flowchart of an audio transmission method according to an embodiment of the present disclosure.

Referring to FIG. 1, FIG. 1 is a flowchart of an audio transmission method according to an embodiment of the present disclosure. The audio transmission method is applied to a first electronic device, and the first electronic device is connected to a second electronic device through wireless connections, such as a Bluetooth connection. It should be noted that the first electronic device and the second electronic device are not specified. In other application scenarios, the first electronic device may be the second electronic device, and the second electronic device may also be used as the first electronic device.

As shown in FIG. 1, the audio transmission method includes the following steps.

Step 101. Modulate, when the first electronic device transmits audio to a second electronic device, an audio signal transmitted to the second electronic device into at least two target radio frequency signals.

It should be noted that there may be one or more second electronic devices.

In this embodiment of the present disclosure, the first electronic device and the second electronic device are connected through Bluetooth. When the first electronic device transmits audio to the second electronic device, an audio signal transmitted to the second electronic device is modulated into target radio frequency signals, where frequency bands of the at least two target radio frequency signals are different from each other. In this way, the audio transmitted from the first electronic device to the second electronic device can be transmitted through at least two target radio frequency signals, which expands the transmission channel in the audio transmission process, thereby improving the transmission rate.

In some embodiments, the manner and principle of modulating the audio signal into the radio frequency signal by the first electronic device may be referred to the related art. Details are not described herein again in this embodiment of the present disclosure.

Step 102. Combine the at least two target radio frequency signals in a first time slot, and output a combined radio frequency signal to the second electronic device.

In this embodiment of the present disclosure, if the frequency bands of the at least two target radio frequency signals are different in the first time slot, correspondingly, the at least two target radio frequency signals may occupy at least two different frequency bands in the first time slot, thus expanding the transmission channel of audio transmission.

For example, the audio transmission of Bluetooth is taken as an example. Currently, the Frequency-Hopping Spread Spectrum (FHSS) is used in the Bluetooth to transmit the radio frequency signal. Although an entire frequency band of 2.4G is occupied, during the Bluetooth transmission process, only one of the channel frequency bands is used in each time slot for communication, and the electronic device can only use different time slots to send audio streams to the Bluetooth device, resulting in a relatively low audio transmission rate.

However, in this embodiment of the present disclosure, in a case that the first electronic device is connected to the second electronic device via Bluetooth, at least two target radio frequency signals transmitted to the second electronic device can be modulated to different frequency bands in a same time slot. As a result, utilization of frequency bands in a same time slot is improved, so that in each time slot, there are at least two or more information flows concurrently in different frequency bands.

It should be noted that there may be one or more second electronic devices. For example, the second electronic device includes a first sub-device and a second sub-device. In this case, the step 101 includes:

when the first electronic device transmits audio to the first sub-device and the second sub-device, modulating an audio signal transmitted to the first sub-device into a first radio frequency signal, and modulating an audio signal transmitted to the second sub-device into a second radio frequency signal; and the step 102 includes:

combining the first radio frequency signal and the second radio frequency signal in the first time slot, and outputting a combined radio frequency signal to the first sub-device and the second sub-device.

It should be noted that the audio transmitted from the first electronic device to the first sub-device and the audio transmitted from the first electronic device to the second sub-device may be a same piece of audio, or may be different pieces of audio. The first electronic device is separately connected to the first sub-device and the second sub-device via Bluetooth. When the first electronic device transmits audio to the first sub-device, the audio signal transmitted to the first sub-device is modulated into a first radio frequency signal, the audio signal transmitted to the second sub-device is modulated into a second radio frequency signal, and a frequency band of the first radio frequency signal is different from a frequency band of the second radio frequency signal in the first time slot. In this way, the radio frequency signal transmitted from the first electronic device to the first sub-device and the radio frequency signal transmitted from the first electronic device to the second sub-device are transmitted through different frequency bands in the same time slot without overlapping, which improves the frequency band utilization in the same time slot, and can also improve the transmission rate.

It should be noted that there may be a plurality of first sub-devices. At this time, a quantity of the first radio frequency signals is consistent with a quantity of the first sub-devices, and each of the first radio frequency signals has a different frequency band in the first time slot. For example, if there are three first sub-devices, the first electronic device may respectively send three first radio frequency signals to the three first sub-devices, and the three first radio frequency signals are corresponding to different frequency bands in a same time slot, to avoid overlapping of information flows of different devices in the same time slot, thereby improving the frequency band utilization in the same time slot.

It can be understood that there may also be a plurality of second sub-devices, a quantity of the second radio frequency signals is consistent with a quantity of the second sub-devices, and each of the second radio frequency signals has a different frequency band in the first time slot.

Figure 2:
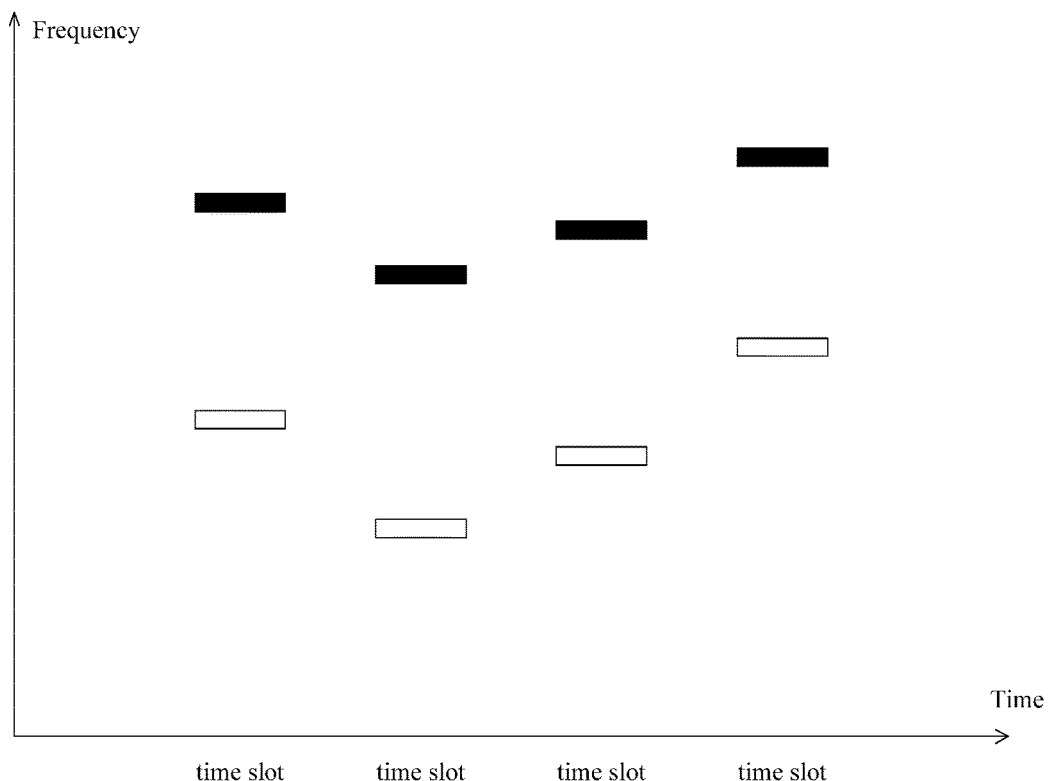
FIG. 2 is a schematic diagram of a frequency band and a time slot of a radio frequency signal to which an audio transmission method provided in FIG. 1 is applied.

Referring to FIG. 2, it is assumed that there is one first sub-device and one second sub-device. As shown in FIG. 2, in a same time slot, the first radio frequency signal transmitted from the first electronic device to the first sub-device (the black square box in FIG. 2) and the second radio frequency signal (the white square box in FIG. 2) transmitted from the first electronic device to the second sub-device are modulated in different frequency bands, and in different time slots, both the first radio frequency signal and the second radio frequency signal are corresponding to different frequency bands, thereby improving the frequency band utilization in the same time slot.

After the first electronic device modulates the first radio frequency signal and the second radio frequency signal to different frequency bands in the first time slot, the first radio frequency signal and the second radio frequency signal are combined by a combiner in the first time slot, and then the combined radio frequency signal is output to the first sub-device and the second sub-device. In this way, the first electronic device can communicate with different devices in a same time slot, thereby improving frequency band utilization of the first electronic device.

As an exemplary implementation, the second electronic device is an earphone, the first sub-device is a left earphone of the earphone, the second sub-device is a right earphone of the earphone, the first radio frequency signal is a left-channel radio frequency signal, and the second radio frequency signal is a right-channel radio frequency signal. The first electronic device may be an electronic device that can output an audio signal to an earphone, such as a mobile phone, a tablet computer, and the like.

For example, the first electronic device is a mobile phone, and Bluetooth and WIFI in the mobile phone coexist in a time-division manner. In a time slot of the WIFI, an antenna is used to transmit a WIFI signal, and in a time slot of the Bluetooth, the antenna is used to transmit a Bluetooth signal. When the mobile phone separately establishes a Bluetooth connection with the left earphone and the right earphone, and is used to transmit an audio signal to the left earphone and the right earphone, the mobile phone can separately modulate a left-channel radio frequency signal transmitted to the left earphone and a right-channel radio frequency signal transmitted to the right earphone to different frequency bands in a same time slot, so that the mobile phone can simultaneously send a signal to the left earphone and the right earphone by using different frequency bands in the same time slot. Compared with the existing Bluetooth transmission mode, in which only one frequency band can be used to send a signal to the left earphone or the right earphone in the same time slot, the solution provided in the embodiments of the present disclosure improves frequency band utilization, thereby improving a data transmission rate, and a data throughput rate of the mobile phone for the left earphone and the right earphone.

In the embodiments of the present disclosure, when the first electronic device transmits audio to the second electronic device, an audio signal transmitted to the second electronic device is modulated into at least two target radio frequency signals; and the at least two target radio frequency signals are combined in a first time slot, and a combined radio frequency signal is output to the second electronic device, where frequency bands of the at least two target radio frequency signals are different in the first time slot. In this way, the first electronic device can realize concurrency of a plurality of radio frequency signals in a same time slot, thereby improving frequency band utilization and a data transmission rate of the first electronic device.

Figure 3:
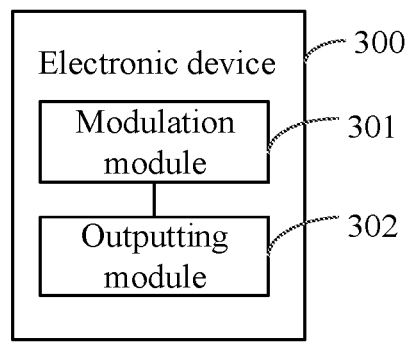
FIG. 3 is a structural diagram of an electronic device according to an embodiment of the present disclosure.

Referring to FIG. 3, FIG. 3 is a structural diagram of an electronic device according to an embodiment of the present disclosure. The electronic device is a first electronic device, and as shown in FIG. 3, the electronic device 300 includes:
  a modulation module 301, configured to modulate, when the first electronic device transmits audio to a second electronic device, an audio signal transmitted to the second electronic device into at least two target radio frequency signals; and
  an outputting module 302, configured to: combine the at least two target radio frequency signals in a first time slot, and output a combined radio frequency signal to the second electronic device, where
  frequency bands of the at least two target radio frequency signals are different in the first time slot.

In some embodiments, the second electronic device includes a first sub-device and a second sub-device, and the modulation module is further configured to:
  when the first electronic device transmits audio to the first sub-device and the second sub-device, modulate an audio signal transmitted to the first sub-device into a first radio frequency signal, and modulate an audio signal transmitted to the second sub-device into a second radio frequency signal; and
  the outputting module is further configured to: combine the first radio frequency signal and the second radio frequency signal in the first time slot, and output a combined radio frequency signal to the first sub-device and the second sub-device.

In some embodiments, there are a plurality of first sub-devices; a quantity of the first radio frequency signals is consistent with a quantity of the first sub-devices, and each of the first radio frequency signals has a different frequency band in the first time slot.

In some embodiments, the second electronic device is an earphone, the first sub-device is a left earphone of the earphone, the second sub-device is a right earphone of the earphone, the first radio frequency signal is a left-channel radio frequency signal, and the second radio frequency signal is a right-channel radio frequency signal.

It should be noted that the electronic device 300 can implement processes of the audio transmission method embodiment shown in FIG. 1 and achieve a same technical effect. To avoid repetition, details are not described herein again.

In the embodiments of the present disclosure, when the electronic device 300 transmits audio to the second electronic device, an audio signal transmitted to the second electronic device is modulated into at least two target radio frequency signals; and the at least two target radio frequency signals are combined in a first time slot, and a combined radio frequency signal is output to the second electronic device, where frequency bands of the at least two target radio frequency signals are different in the first time slot. In this way, the electronic device 300 can realize concurrency of a plurality of radio frequency signals in a same time slot, thereby improving frequency band utilization and a data transmission rate of the electronic device 300.

Figure 4:
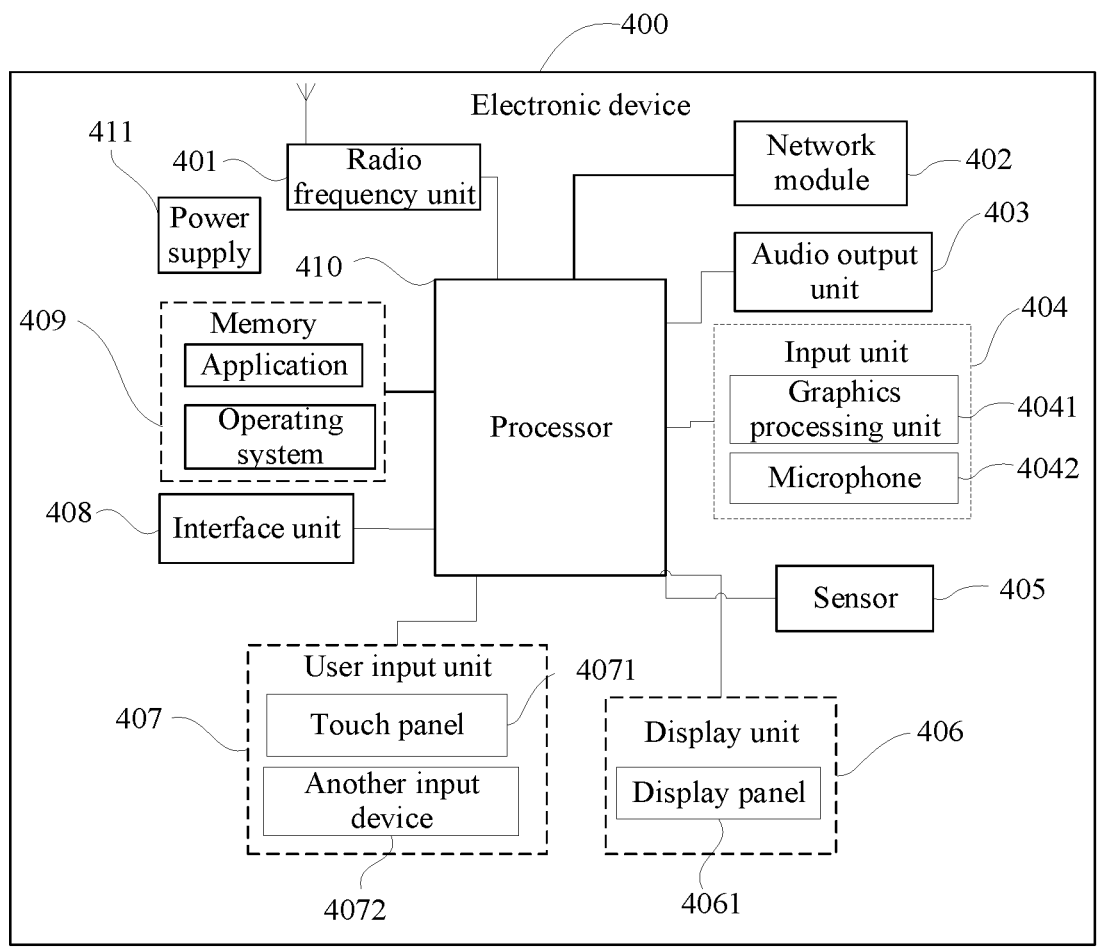
FIG. 4 is a structural diagram of another electronic device according to an embodiment of the present disclosure.

Referring to FIG. 4, FIG. 4 is a structural diagram of another electronic device for implementing an embodiment of the present disclosure. The electronic device 400 can implement processes of the audio transmission method embodiment shown in FIG. 1 and achieve a same technical effect. As shown in FIG. 4, the electronic device 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and other components. A person skilled in the art may understand that a structure of the electronic device shown in FIG. 4 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

The processor 410 is configured to:
  modulate, when the first electronic device transmits audio to a second electronic device, an audio signal transmitted to the second electronic device into at least two target radio frequency signals; and
  the radio frequency unit 401 is configured to: combine the at least two target radio frequency signals in a first time slot, and output a combined radio frequency signal to the second electronic device, where
  frequency bands of the at least two target radio frequency signals are different in the first time slot.

In some embodiments, the second electronic device includes a first sub-device and a second sub-device, and the processor 410 is further configured to:
  when the first electronic device transmits audio to the first sub-device and the second sub-device, modulate an audio signal transmitted to the first sub-device into a first radio frequency signal, and modulate an audio signal transmitted to the second sub-device into a second radio frequency signal; and
  the radio frequency unit 401 is further configured to: combine the first radio frequency signal and the second radio frequency signal in the first time slot, and output a combined radio frequency signal to the first sub-device and the second sub-device.

In some embodiments, there are a plurality of first sub-devices; a quantity of the first radio frequency signals is consistent with a quantity of the first sub-devices, and each of the first radio frequency signals has a different frequency band in the first time slot.

In some embodiments, the second electronic device is an earphone, the first sub-device is a left earphone of the earphone, the second sub-device is a right earphone of the earphone, the first radio frequency signal is a left-channel radio frequency signal, and the second radio frequency signal is a right-channel radio frequency signal.

In the embodiments of the present disclosure, when the electronic device 400 transmits audio to the second electronic device, an audio signal transmitted to the second electronic device is modulated into at least two target radio frequency signals; and the at least two target radio frequency signals are combined in a first time slot, and a combined radio frequency signal is output to the second electronic device, where frequency bands of the at least two target radio frequency signals are different in the first time slot. In this way, the electronic device 400 can realize concurrency of a plurality of radio frequency signals in a same time slot, thereby improving frequency band utilization and a data transmission rate of the electronic device 400.

It should be understood that, in this embodiment of the present disclosure, the radio frequency unit 401 may be configured to receive and send information or receive and send a signal in a call process. In some embodiments, after downlink data from a base station is received, the processor 410 processes the downlink data. In addition, uplink data is sent to the base station. Usually, the radio frequency unit 401 includes but is not limited to an antenna, at least one amplifier, a transceiver, a coupler, a low noise amplifier, a duplexer, and the like. In addition, the radio frequency unit 401 may communicate with a network and another device through a wireless communication system.

The electronic device 400 provides wireless broadband Internet access for the user by using the network module 402, for example, helping the user to send and receive an e-mail, brows a web page, and access streaming media.

The audio output unit 403 may convert audio data received by the radio frequency unit 401 or the network module 402 or stored in the memory 409 into an audio signal and output the audio signal as a sound. Moreover, the audio output unit 403 may further provide audio output related to a specific function performed by the electronic device 400 (for example, a call signal receiving sound and a message receiving sound). The audio output unit 403 includes a loudspeaker, a buzzer, a telephone receiver, and the like.

The input unit 404 is configured to receive an audio signal or a video signal. The input unit 404 may include a Graphics Processing Unit (GPU) 4041 and a microphone 4042. The graphics processing unit 4041 processes image data of a static image or a video obtained by an image capturing apparatus (for example, a camera) in a video capturing mode or an image capturing mode. A processed image frame may be displayed on the display unit 406. The image frame processed by the graphics processing unit 4041 can be stored in the memory 409 (or another computer readable storage medium) or sent via the radio frequency unit 401 or the network module 402. The microphone 4042 may receive sound and can process such sound into audio data. The processed audio data may be converted in a call mode into a format that can be sent by the radio frequency unit 401 to a mobile communication base station for outputting.

The electronic device 400 further includes at least one sensor 405 such as a light sensor, a motion sensor, and another sensor. In some embodiments, the light sensor includes an ambient light sensor and a proximity sensor. The ambient light sensor may adjust luminance of the display panel 4041 based on brightness of ambient light. The proximity sensor may turn off the display panel 4041 and/or backlight when the electronic device 400 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein again.

The display unit 406 is configured to display information input by a user or information provided for a user. The display unit 406 may include the display panel 4041, and the display panel 4041 may be configured in a form of a Liquid Crystal Display (LCD), an Organic Light-Emitting Diode (OLED), or the like.

The user input unit 407 may be configured to: receive entered digital or character information, and generate key signal input related to a user setting and function control of the electronic device 400. In some embodiments, the user input unit 407 includes a touch panel 4071 and another input device 4072. The touch panel 4071 is also referred to as a touchscreen, and may collect a touch operation performed by a user on or near the touch panel 4071 (for example, an operation performed by a user on the touch panel 4071 or near the touch panel 4071 by using any proper object or accessory, for example, a finger or a stylus). The touch panel 4071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 4071 may be implemented in various types such as a resistor, a capacitor, an infrared ray, or a surface acoustic wave. The user input unit 407 may include other input devices 4072 in addition to the touch panel 4071. In some embodiments, the another input device 4072 may include but is not limited to: a physical keyboard, function keys (for example, a volume control key and an on/off key), a trackball, a mouse, or a joystick. Details are not described herein.

Further, the touch panel 4071 may cover the display panel 4041. When detecting the touch operation on or near the touch panel 4071, the touch panel 4071 transmits the touch operation to the processor 410 to determine a type of a touch event, and then the processor 410 provides corresponding visual output on the display panel 4041 based on the type of the touch event. Although the touch panel 4071 and the display panel 4041 in FIG. 4 are configured as two independent components to implement input and output functions of the electronic device 400, in some embodiments, the touch panel 4071 and the display panel 4041 may be integrated to implement the input and output functions of the electronic device 400. Details are not limited herein.

The interface unit 408 is an interface for connecting an external apparatus with the electronic device 400. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 408 may be configured to receive an input (for example, data information and power) from an external apparatus and transmit the received input to one or more elements in the electronic device 400 or may be configured to transmit data between the electronic device 400 and the external apparatus.

The memory 409 may be configured to store a software program and various data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 409 may include a high-speed random access memory, and may further include a nonvolatile memory, for example, at least one magnetic disk storage device, a flash storage device, or another volatile solid-state storage device.

The processor 410 is a control center of the electronic device 400, connects all parts of the entire electronic device 400 by using various interfaces and lines, and performs various functions of the electronic device 400 and data processing by miming or executing a software program and/or a module that are/is stored in the memory 409 and by invoking data stored in the memory 409, thereby performing overall monitoring on the electronic device 400. The processor 410 may include one or more processing units. Preferably, an application processor and a modem processor may be integrated into the processor 410. The application processor mainly processes an operating system, a user interface, an application, and the like. The modem processor mainly processes wireless communications. It can be understood that, alternatively, the modem processor may not be integrated into the processor 410.

The electronic device 400 may further include the power supply 411 (for example, a battery) supplying power to each component. Preferably, the power supply 411 may be logically connected to the processor 410 by using a power management system, so as to implement functions such as charging management, discharging management, and power consumption management by using the power management system.

In addition, the electronic device 400 includes some function modules not shown. Details are not described herein.

In some embodiments, an embodiment of the present disclosure further provides an electronic device, including a processor, a memory, and a computer program stored in the memory and executable on the processor. When the computer program is executed by the processor, processes of the audio transmission method embodiment shown in FIG. 1 are implemented, and a same technical effect can be achieved. To avoid repetition, details are not described herein again.

An embodiment of the present disclosure further provides a computer-readable storage medium. The computer-readable storage medium stores a computer program, where when the computer program is executed by a processor, processes of the audio transmission method embodiment shown in FIG. 1 are implemented, and a same technical effect can be achieved. To avoid repetition, details are not described herein again. The computer-readable storage medium includes a Read-Only Memory (ROM for short), a Random Access Memory (RAM for short), a magnetic disk, an optical disc, or the like.

It can be understood that the embodiments described in the present disclosure may be implemented by hardware, software, firmware, middleware, microcode, or a combination thereof. For implementation with hardware, the module, unit, submodule, and subunit may be implemented in one or more Application Specific Integrated Circuits (ASIC), a Digital Signal Processor (DSP), a DSP Device (DSPD), a Programmable Logic Device (PLD), a Field-Programmable Gate Array (FPGA), general processors, controllers, microcontrollers, micro-processors, and other electronic units for implementing the functions of the present application, or their combinations.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by the statement "including a . . . " does not exclude another same element in this process, method, article, or apparatus that includes the element.

By means of the foregoing description of the embodiments, a person skilled in the art may clearly understand that the method in the foregoing embodiments may be implemented by software in addition to a necessary universal hardware platform. Certainly, the method in the foregoing embodiments may also be implemented by hardware. However, in many cases, the former is a preferred embodiment. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. An audio transmission method, performed by a first electronic device, wherein the method comprises:
    modulating an audio signal transmitted to a second electronic device into at least two target radio frequency signals comprising modulating an audio signal transmitted to a first sub-device into a first radio frequency signal and modulating an audio signal transmitted to a second sub-device into a second radio frequency signal, wherein the second electronic device comprises a first sub-device and a second sub-device; and
    combining the first radio frequency signal and the second radio frequency signal in a first time slot, and outputting a combined radio frequency signal to the first sub-device and the second sub-device of the second electronic device, wherein frequency bands of the first radio frequency signal and the second radio frequency signal are different in the first time slot, wherein there are a plurality of first sub-devices, a quantity of the first radio frequency signals is consistent with a quantity of the first sub-devices, and each of the first radio frequency signals has a different frequency band in the first time slot.

2. The method according to claim 1, wherein the second electronic device is an earphone, the first sub-device is a left earphone of the earphone, the second sub-device is a right earphone of the earphone, the first radio frequency signal is a left-channel radio frequency signal, and the second radio frequency signal is a right-channel radio frequency signal.

3. A first electronic device, comprising:
a memory storing computer-readable instructions; and
a processor coupled to the memory and configured to execute the computer-readable instructions, wherein the computer-readable instructions, when executed by the processor, cause the processor to perform operations comprising:
modulating an audio signal transmitted to a second electronic device into at least two target radio frequency signals comprising modulating an audio signal transmitted to a first sub-device into a first radio frequency signal and modulating an audio signal transmitted to a second sub-device into a second radio frequency signal, wherein the second electronic device comprises a first sub-device and a second sub-device; and
combining the first radio frequency signal and the second radio frequency signal in a first time slot, and outputting a combined radio frequency signal to the first sub-device and the second sub-device of the second electronic device, wherein
frequency bands of the first radio frequency signal and the second radio frequency signal are different in the first time slot,
wherein there are a plurality of first sub-devices, a quantity of the first radio frequency signals is consistent with a quantity of the first sub-devices, and each of the first radio frequency signals has a different frequency band in the first time slot.

4. The first electronic device according to claim 3, wherein the second electronic device is an earphone, the first sub-device is a left earphone of the earphone, the second sub-device is a right earphone of the earphone, the first radio frequency signal is a left-channel radio frequency signal, and the second radio frequency signal is a right-channel radio frequency signal.

5. A non-transitory computer-readable medium, storing computer-readable instructions that, when executed by a processor of a first electronic device, cause the processor to perform operations comprising:
modulating an audio signal transmitted to a second electronic device into at least two target radio frequency signals comprising modulating an audio signal transmitted to a first sub-device into a first radio frequency signal and modulating an audio signal transmitted to a second sub-device into a second radio frequency signal, wherein the second electronic device comprises a first sub-device and a second sub-device; and
combining the first radio frequency signal and the second radio frequency signal in a first time slot, and outputting a combined radio frequency signal to the first sub-device and the second sub-device of the second electronic device, wherein
frequency bands of the first radio frequency signal and the second radio frequency signal are different in the first time slot,
wherein there are a plurality of first sub-devices, a quantity of the first radio frequency signals is consistent with a quantity of the first sub-devices, and each of the first radio frequency signals has a different frequency band in the first time slot.

6. The non-transitory computer-readable medium according to claim 5, wherein the second electronic device is an earphone, the first sub-device is a left earphone of the earphone, the second sub-device is a right earphone of the earphone, the first radio frequency signal is a left-channel radio frequency signal, and the second radio frequency signal is a right-channel radio frequency signal.

* * * * *